US008681885B2

(12) United States Patent
Chung et al.

(10) Patent No.: US 8,681,885 B2
(45) Date of Patent: Mar. 25, 2014

(54) OFDM RECEIVER AND METHOD FOR COMPENSATING FOR I/Q IMBALANCE (75) Inventors: Hwan-Seok Chung, Daejeon-si (KR); Sun-Hyok Chang, Daejeon-si (KR); Kwang-Joon Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 435 days.

(21) Appl. No.: 12/872,506

(22) Filed: Aug. 31, 2010

(65) Prior Publication Data
US 2011/0090992 A1  Apr. 21, 2011

(30) Foreign Application Priority Data
Oct. 15, 2009 (KR) .................. 10-2009-0098285

(51) Int. Cl.
*H04K 1/10* (2006.01)
(52) U.S. Cl.
USPC .......................................... 375/260; 375/316
(58) Field of Classification Search
USPC ........... 375/260, 316, 317, 296, 319; 370/208
See application file for complete search history.

(56) References Cited

U.S. PATENT DOCUMENTS

| 7,643,405 B1 * | 1/2010 | Narasimhan ................. 370/208 |
| 2005/0152463 A1 | 7/2005 | DeChamps et al. |
| 2008/0089443 A1 * | 4/2008 | Sanada et al. ................. 375/319 |
| 2008/0095264 A1 * | 4/2008 | Deng et al. ..................... 375/296 |
| 2008/0130780 A1 | 6/2008 | Cho et al. |
| 2009/0122918 A1 * | 5/2009 | Li et al. ......................... 375/317 |

FOREIGN PATENT DOCUMENTS

| EP | 1 924 003 | 11/2007 |
| KR | 10-2007-0099505 | 10/2007 |
| KR | 10-0809206 | 2/2008 |
| KR | 10-2009-0089531 | 8/2009 |
| WO | 2009/104909 A2 | 8/2009 |

OTHER PUBLICATIONS

Compensation Schemes and Performance Analysis of IQ Imbalances in OFDM Receivers IEEE Trans. on Sig. Proc. vol. 53, No. 8 2005, pp. 3257-3268.
Implementation of Digital IQ Imbalance Compensation in OFDM WLAN Receivers, IEEE 2006, pp. 3534-3537.

* cited by examiner

Primary Examiner — Daniel Washburn
Assistant Examiner — Fitwi Hailegiorgis
(74) Attorney, Agent, or Firm — Staas & Halsey LLP (57) ABSTRACT An OFDM receiver for compensating for I/Q imbalance is provided. The OFDM receiver includes an I/Q demodulator demodulating a received signal into a baseband in-phase (I) channel signal and a baseband quadrature (Q) channel signal, and an I/Q imbalance compensator compensating for imbalance between the I-channel signal and the Q-channel signal in a time domain. Accordingly, it is possible to solve the I/Q imbalance and suppress degradation in the performance of the OFDM communication device.

3 Claims, 8 Drawing Sheets

OFDM RECEIVER AND METHOD FOR COMPENSATING FOR I/Q IMBALANCE

CROSS-REFERENCE TO RELATED APPLICATION

This application claims the benefit under 35 U.S.C. §119 (a) of Korean Patent Application No. 10-2009-0098285, filed on Oct. 15, 2009, the entire disclosure of which is incorporated herein by reference for all purposes.

BACKGROUND

1. Field

The following description relates to an orthogonal frequency division multiplexing (OFDM) receiver for receiving an OFDM-based signal and, more particularly, to an OFDM receiver and method for compensating for phase and gain imbalance between in-phase (I) and quadrature (Q) channels.

2. Description of the Related Art

OFDM is a frequency-division multiplexing scheme utilized as a digital multi-carrier modulation method. A large number of closely-spaced orthogonal sub-carriers are used to carry data. The data is divided into several parallel data streams or channels, one for each sub-carrier. Each sub-carrier is modulated with a conventional modulation scheme at a low symbol rate. One key principle of OFDM is that since low symbol rate modulation schemes suffer less from intersymbol interference caused by multipath propagation, it is advantageous to transmit a number of low-rate streams in parallel instead of a single high-rate stream. In OFDM, the sub-carrier frequencies are chosen so that the sub-carriers are orthogonal to each other, which allows high spectral efficiency.

More specifically, an OFDM transmitter divides a single high-rate data stream into a number of low-rate parallel data streams, modulates each sub-carrier carrying each parallel data stream using a conventional modulation scheme, such as quadrature phase shift keying (QPSK) or quadrature amplitude modulation (QAM), performs Inverse Fast Fourier Transform (IFFT) to convert the modulated sub-carrier into a time-domain signal, and inserts a pilot symbol, a training symbol or a cyclic prefix (CP) to generate a complex-valued signal. In this case, assuming that real and imaginary parts of the complex-valued signal are respectively referred to as an I-channel and a Q-channel, carriers with a phase difference of 90 degrees are used to carry the I-channel and Q-channel.

On the other hand, an OFDM receiver receives the carriers from the OFDM transmitter, produces a baseband complex-valued signal by multiplying an earlier-received one of the carriers in reverse order in the OFDM transmitter with a local oscillator (LO) signal with a phase difference of 90 degrees from the carrier, performs a frequency difference compensation process and a time synchronization process, performs FFT to be converted into a frequency-domain signal, performs an equalization process, and extracts an information signal.

In this case, however, if the phase difference between signals applied to the I-channel and Q-channel in the transmitter or receiver is not equal to 90 degrees or the signals do not have the same amplitude, I/Q imbalance occurs, resulting in severe degradation in the performance of the OFDM system.

SUMMARY

The following description relates to an OFDM receiver and a method for compensating for I/Q imbalance.

In one general aspect, there is provided an orthogonal frequency division multiplexing (OFDM) receiver for compensating for I/Q imbalance, including: an I/Q demodulator demodulating a received signal into a baseband in-phase (I) channel signal and a baseband quadrature (Q) channel signal; and an I/Q imbalance compensator compensating for imbalance between the I-channel signal and the Q-channel signal in a time domain.

In another general aspect, there is provided an OFDM receiver for compensating for I/Q imbalance, including: a time-domain signal processor demodulating a received signal into a baseband I-channel signal and a baseband Q-channel signal and compensating for imbalance between the I-channel signal and the Q-channel signal in a time domain; and a frequency-domain signal processor converting a time-domain signal output from the time-domain signal processor into a frequency-domain signal and processing the frequency-domain signal.

According to still another general aspect, there is provided a method of compensating for I/Q imbalance between an I-channel signal and a Q-channel signal in an OFDM receiver, including: receiving demodulated baseband I-channel and Q-channel signals; and compensating for I/Q imbalance between the I-channel signal and the Q-channel signal in a time domain.

Other features and aspects will be apparent from the following detailed description, the drawings, and the claims.

BRIEF DESCRIPTION OF THE DRAWINGS

Throughout the drawings and the detailed description, unless otherwise described, the same reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
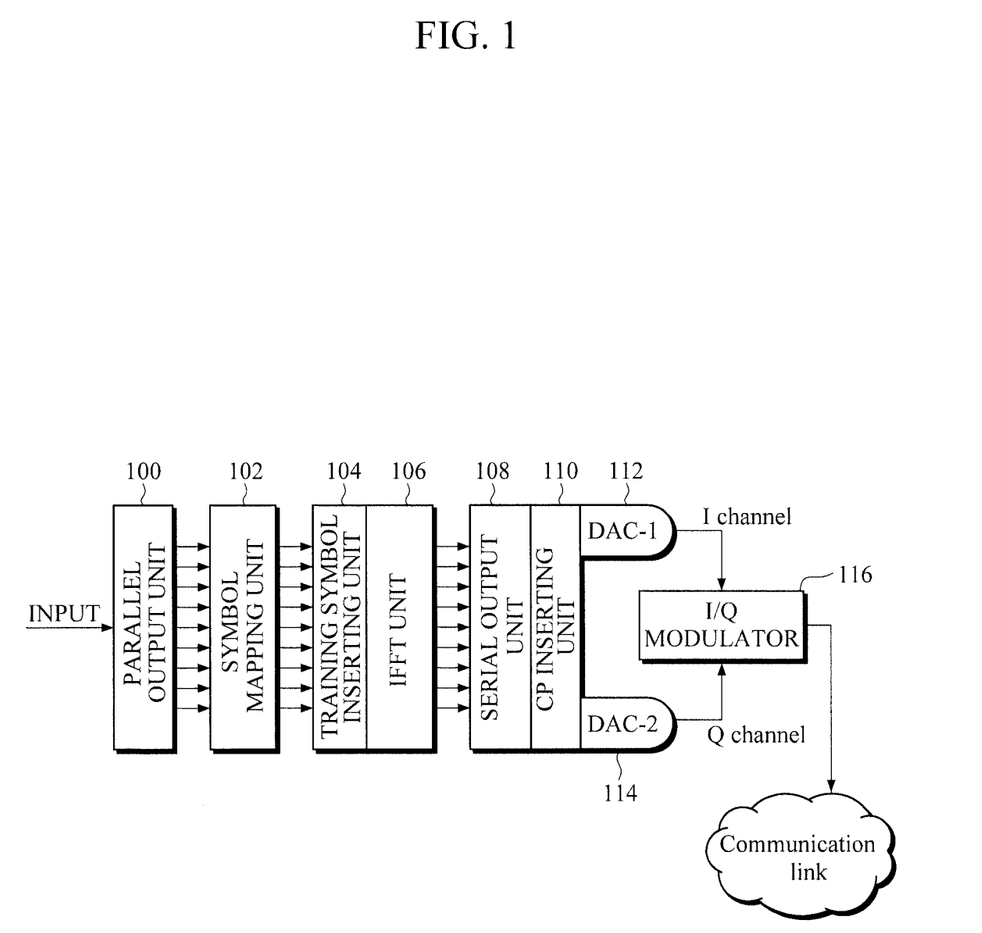
FIG. 1 is a block diagram illustrating an example of an OFDM transmitter.

FIG. 1 is a block diagram illustrating an example of an OFDM transmitter.

The OFDM transmitter includes a parallel output unit 100, a symbol mapping unit 102, a training symbol inserting unit 104, an inverse fast Fourier transform (IFFT) unit 106, a serial output unit 108, a cyclic prefix (CP) inserting unit 110, a DAC-1 112, a DAC-2 114, and an I/Q modulator 116.

The parallel output unit 100 converts a high-rate serial digital signal into low-rate parallel digital signals. The symbol mapping unit 102 performs symbol mapping, such as QPSK or QAM, on the parallel digital signals, whereby multiple bits are mapped to a single symbol. The training symbol inserting unit 104 inserts a predetermined symbol, i.e., a training symbol, into the symbol-mapped digital signals at regular intervals. The IFFT unit 106 performs IFFT on the frequency-domain digital signals including the training symbol to convert them into time-domain digital signals. The time-domain digital signal becomes a complex-valued signal. The time-domain digital signals are input to the serial output unit 108. The serial output unit 108 converts the input digital signals into a high-rate serial digital signal. The CP inserting unit 110 inserts a CP into the high-rate serial digital signal. The DAC-1 112 receives a real-valued digital signal from the complex-valued signal with the CP inserted and converts the real-valued digital signal into an analog signal. The DAC-2 114 receives an imaginary-valued digital signal from the complex-valued signal with the CP inserted and converts the imaginary-valued digital signal into an analog signal. Assuming that the real-valued signal and the imaginary-valued signal are an I channel and a Q channel, respectively, the I-channel signal output from the DAC-1 112 and the Q-channel signal output from the DAC-2 114 are input to the I/Q modulator 116. The I/Q modulator 116 uses carriers with a phase difference of 90 degrees to each other to carry the I-channel and Q-channel signals and transmits the high-frequency signals to an OFDM receiver through a communication link.

Figure 2:
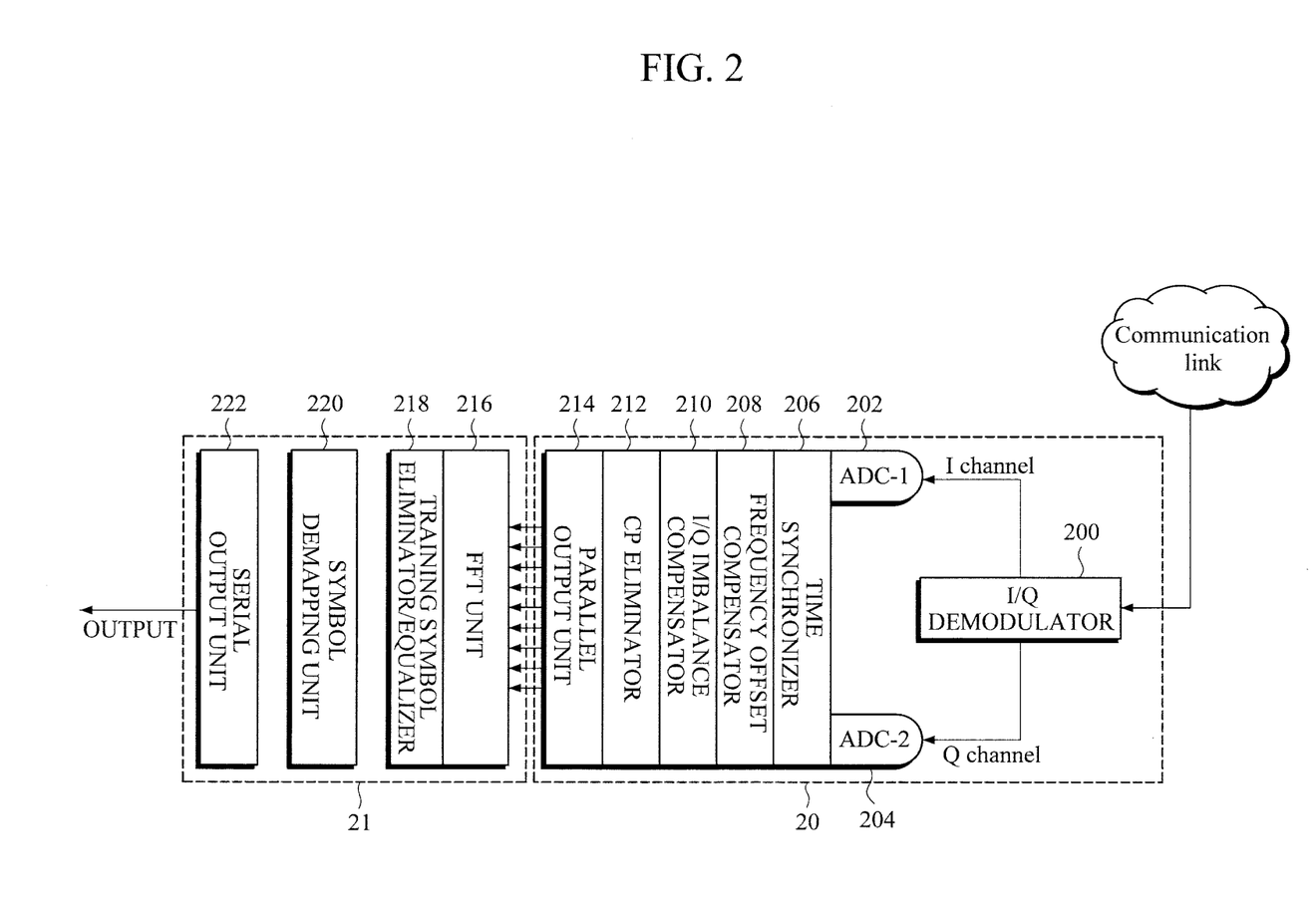
FIG. 2 is a block diagram illustrating an example of an OFDM receiver according to an exemplary embodiment of the present invention.

FIG. 2 is a block diagram illustrating an example of an OFDM receiver according to an exemplary embodiment of the present invention.

The OFDM receiver includes a time-domain signal processor 20 and a frequency-domain signal processor 21. The time-domain signal processor 20 demodulates a received signal into a baseband I-channel signal and a baseband Q-channel signal, and compensates for imbalance between the I-channel signal and the Q-channel signal. The frequency-domain signal processor 21 converts the time-domain signal output from the time-domain signal processor 20 into a frequency-domain signal and performs signal processing on the frequency-domain signal.

The time-domain signal processor 20 includes an I/Q demodulator 200, an ADC-1 202, an ADC-2 204, a time synchronizer 206, a frequency offset compensator 208, an I/Q imbalance compensator 210, a CP eliminator 212, and a parallel output unit 214. The frequency-domain signal processor 21 includes an FFT unit 216, a training symbol eliminator/equalizer 218, a symbol demapping unit 220, and a serial output unit 222.

The I/Q demodulator 200 receives the high-frequency signal from the OFDM transmitter through the communication line and produces a baseband complex-valued signal by multiplying the high-frequency signal by a local oscillator (LO) signal with a phase difference of 90 degrees from the high-frequency signal. An I-channel signal of the complex-valued signal is input to the ADC-1 202 and a Q-channel signal is input to the ADC-2 204. The ADC-1 202 converts the analog I-channel signal into a digital signal and the ADC-2 204 converts the analog Q-channel signal into a digital signal. The time synchronizer 206 performs time synchronization on the digital signal output from the ADC-1 202 and the ADC-2 204 to extract a start point of payload data. The frequency offset compensator 208 compensates for a frequency difference between an oscillator of the transmitter and an oscillator of the receiver.

The I/Q imbalance compensator 210 compensates for I/Q imbalance generated by the I/Q modulator 116 in the transmitter or the I/Q demodulator 200 in the receiver. Although the frequency offset compensator 208 is followed by the I/Q imbalance compensator 210 in FIG. 2, the I/Q imbalance compensator 210 may be disposed anywhere upstream of the FFT unit 216. By way of example, the I/Q imbalance compensator 210 may be followed by the frequency offset compensator 208. The I/Q imbalance compensator 210 may be disposed upstream and downstream of the frequency offset compensator 208.

The CP eliminator 212 eliminates a CP from the digital signal. The parallel output unit 214 outputs the digital signal with the CP eliminated in parallel. The parallel digital signals are input to the FFT unit 216. The FFT unit 216 performs FFT on the parallel digital signals to be converted into frequency-domain signals. The training symbol eliminator/equalizer 218 eliminates a training symbol from the parallel frequency-domain signals and performs equalization on the parallel frequency-domain signals with the training symbol eliminated. The symbol demapping unit 220 performs demapping on the parallel frequency-domain signals which have been subjected to the equalization process. The serial output unit 222 outputs the parallel signals which have been subjected to the demapping process in series.

Although the signals which are input to the OFDM transmitter and are output from the OFDM receiver are illustrated as serial signals in FIGS. 1 and 2, the parallel output unit 100 and the serial output unit 222 may be omitted so that the signals may be input and output in parallel.

The I/Q imbalance compensation process of the I/Q imbalance compensator 210 will be described in detail.

Firstly, I/Q imbalance which occurs in an OFDM I/Q modulation/demodulation process will be discussed. Assuming that r(t) is an ideal time-domain OFDM signal, an OFDM signal caused by I/Q imbalance generated in an I/Q modulation process of the transmitter is expressed as follows:

$$y_o(t)=(G_1r(t)+G^*_2r^*(t))\exp(j\omega_s t)+(G^*_1r^*(t)+G_2r(t))\exp(-j\omega_s t) \quad (1)$$

where $G_1=(1+\epsilon_t \exp(j\phi_t))/2$, $G_2=(1-\epsilon_t \exp(-j\phi_t))/2$, $\omega_s$ is an oscillator frequency of the transmitter, and $\epsilon_t$ and $\phi_t$ are the amplitude and phase difference of the I channel and Q channel, respectively, which are generated by the I/Q modulator 116.

If the frequency offset between the receiver and transmitter is $\omega_o$, the OFDM signal input to an ideal receiver is expressed by Equation 2:

$$y_e(t)=(G_1r(t)+G^*_2r^*(t))\exp(-j\omega_o t) \quad (2)$$

Figure 3:
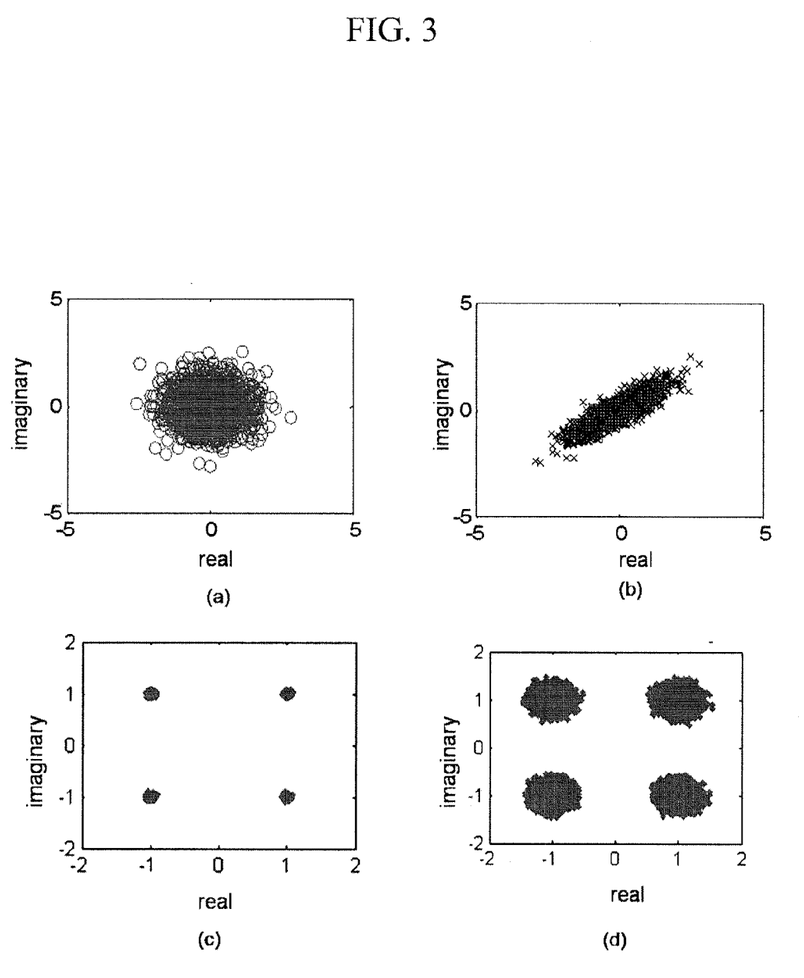
FIG. 3 illustrates a constellation diagram based on I/Q imbalance in a time domain.

If the I/Q modulator 116 is ideal, i.e., $\epsilon_t=1$ and $\phi_t=0$, a constellation diagram represented as the real and imaginary parts of the OFDM signal in a time domain is circular as shown in FIG. 3A and is represented as shown in FIG. 3C after FFT is performed on the signal. On the other hand, if the I/Q modulator 116 is not ideal, the time-domain OFDM signal is is distorted into an oval by G1 and G2 as shown in FIG. 3B and is degraded in amplitude and phase as shown in FIG. 3D after FFT is performed on the signal.

The OFDM signal modulated by the ideal I/Q modulator 116 is expressed by Equation 3. If the OFDM signal is distorted by the I/Q demodulator 200 in the receiver, the OFDM signal is expressed as distorted by $K_1$ and $K_2$ in Equation 4.

$$y_o(t)=r(t)\exp(j\omega_o t)+r^*(t)\exp(-j\omega_o t) \quad (3)$$

$$y_e(t)=K_1 r(t)\exp(j\omega_o t)+K_2 r^*(t)\exp(-j\omega_o t) \quad (4)$$

where $K_1=(1+\epsilon_r \exp(-j\phi_r))/2$, $K_2=(1-\epsilon_r \exp(j\phi_r))/2$, $\epsilon_r$ and $\phi_r$ denote the amplitude and phase difference of the I/Q channel, respectively, which are generated in the I/Q demodulator 200, and $\omega_o$ is a frequency difference between the oscillator in the I/Q modulator 116 and the oscillator in the I/Q demodulator 200.

Also in the case of the I/Q imbalance generated by the I/Q demodulator 200, the received OFDM signal is distorted as shown in FIG. 3B after the frequency offset is compensated for, and is degraded in phase after FFT is performed on the OFDM signal as shown in FIG. 3D.

Figure 4:
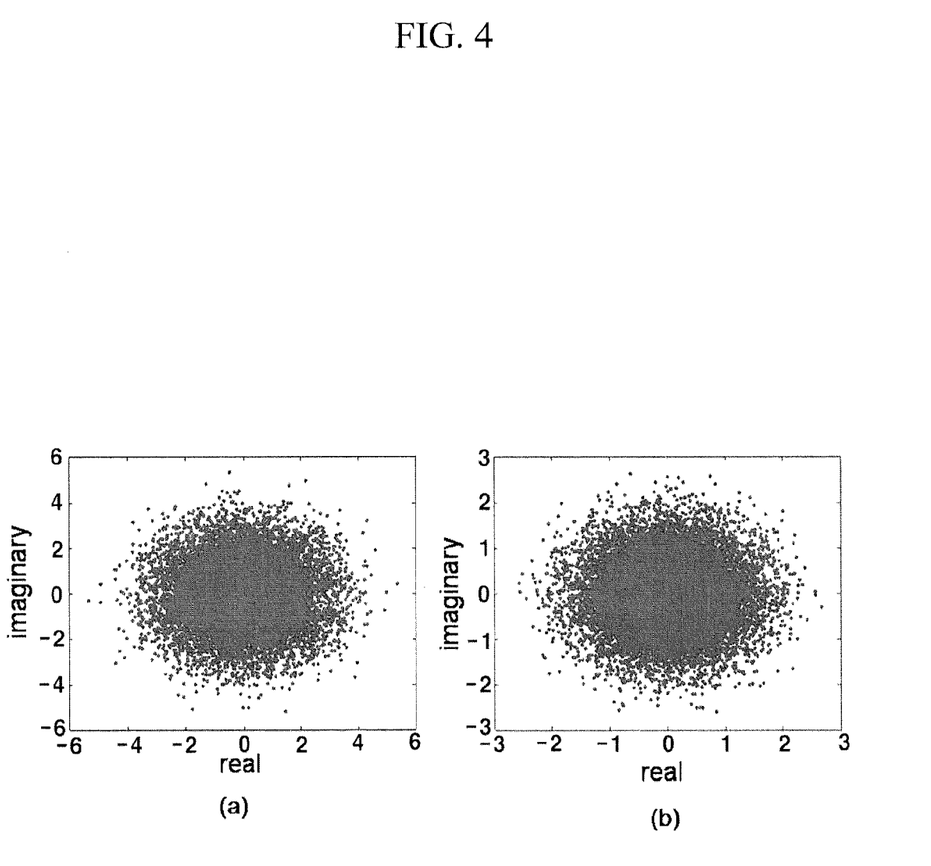
FIG. 4 illustrates a constellation diagram in a case where I/Q imbalance and frequency offset occur.

If both the frequency offset and the I/Q imbalance occur together, the OFDM signal is distorted. More specifically, if the I/Q imbalance generated by the I/Q modulator 116 in the transmitter and the frequency offset occur together, a circular constellation is generated as shown in FIG. 4A as though there were no I/Q imbalance. On the other hand, in a case where the I/Q imbalance is generated by the I/Q demodulator 200 in the receiver, if the I/Q imbalance is not compensated for while the frequency offset is compensated for, a circular constellation is generated as shown in FIG. 4B as though there were no I/Q imbalance.

Accordingly, if the I/Q imbalance is generated by the I/Q modulator 116 in the transmitter, the I/Q imbalance needs to be compensated for after the frequency offset is compensated for. If the I/Q imbalance is generated by the I/Q demodulator 200 in the receiver, the frequency offset needs to be compensated for after the I/Q imbalance is compensated for. On the other hand, if the I/Q imbalance is generated by both the I/Q modulator 116 in the transmitter and the I/Q demodulator 200 in the receiver, the I/Q imbalance needs to be compensated for before and after the frequency offset is compensated for. For an OFDM system where the frequency offset is not generated, the I/Q imbalance only needs to be compensated for once before the FFT is performed. As a result, the I/Q imbalance compensator 210 may be disposed upstream and/or downstream of the frequency offset compensator 208. If the frequency offset compensator 208 is not provided, the I/Q imbalance compensator 210 may be disposed upstream of the FFT unit 216.

In one embodiment, the I/Q imbalance compensator 210 compensates for the I/Q imbalance using an orthogonality algorithm which is used to make two non-orthogonal vectors orthogonal to each other. More specifically, the orthogonality algorithm is used to make two non-orthogonal vectors orthogonal to each other and normalized in amplitude. Accordingly, the I/Q imbalance compensator 210 may use the orthogonality algorithm to compensate for errors in the amplitude and phase difference between the I channel and the Q channel which are due to incomplete I/Q modulation/demodulation.

Assuming that two non-orthogonal I and Q channels are $r_I(t)$ and $r_Q(t)$, respectively, the I/Q imbalance compensator 210 generates two orthogonal I and Q channels $r_I^o(t)$ and $r_Q^o(t)$ from the following equations:

$$r_I'(t)=r_I(t)/\text{sqrt}(P_I) \quad (5)$$

$$r_Q'(t)=r_Q(t)-\rho r_I(t)/P_I, \rho=E\{r_I(t), r_Q(t)\} \quad (6)$$

$$r_Q^o(t)=r_Q'(t)/\text{sqrt}(P_Q) \quad (7)$$

where $P_I$ and $P_Q$ are average power of $r_I(t)$ and average power of $r_Q'(t)$, respectively.

Figure 5:
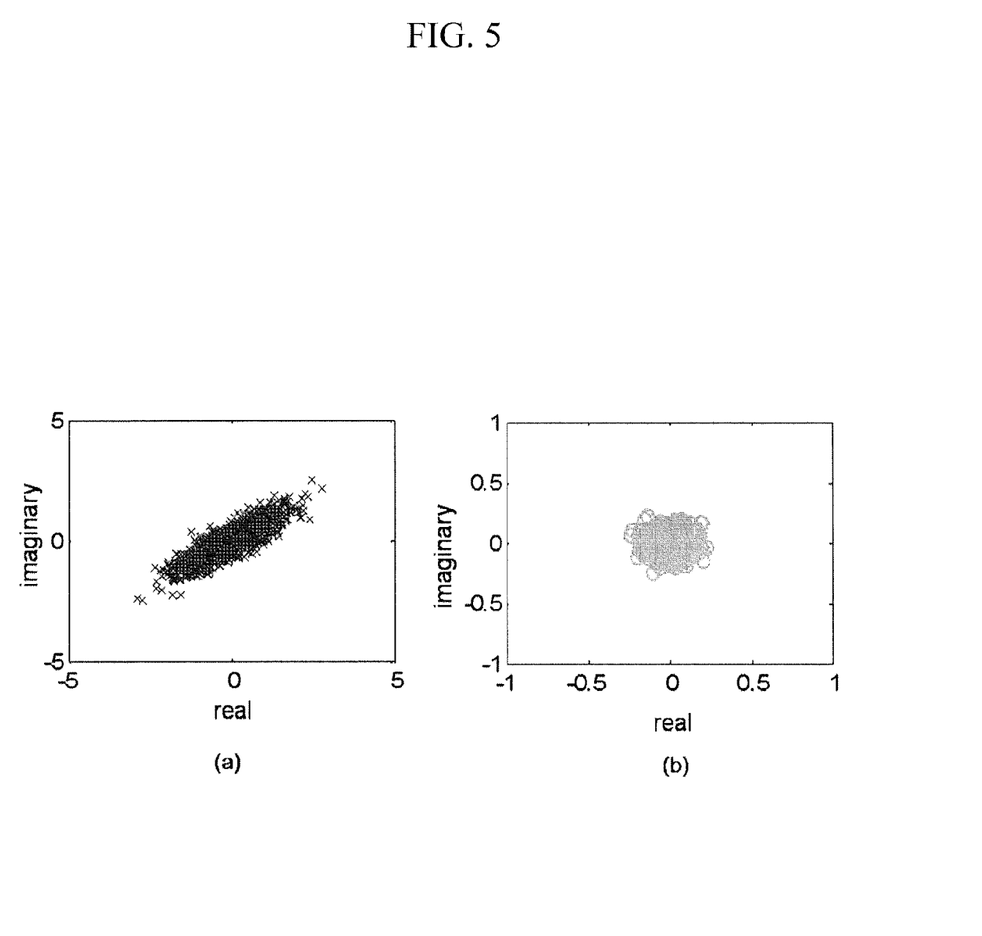
FIG. 5 illustrates a constellation diagram before and after an I/Q imbalance compensation process in a time domain according to an exemplary embodiment of the present invention.

If the I/Q imbalance is compensated for by the I/Q imbalance compensator 210 using the orthogonality algorithm, a constellation distorted into an oval due to the I/Q imbalance as shown in FIG. 5A may be turned into a circular constellation as shown in FIG. 5B. In other words, the I/Q imbalance compensator 210 may convert a distorted non-circular constellation into a circular constellation in a time domain by using the orthogonality algorithm to compensate for the I/Q imbalance.

Figure 6:
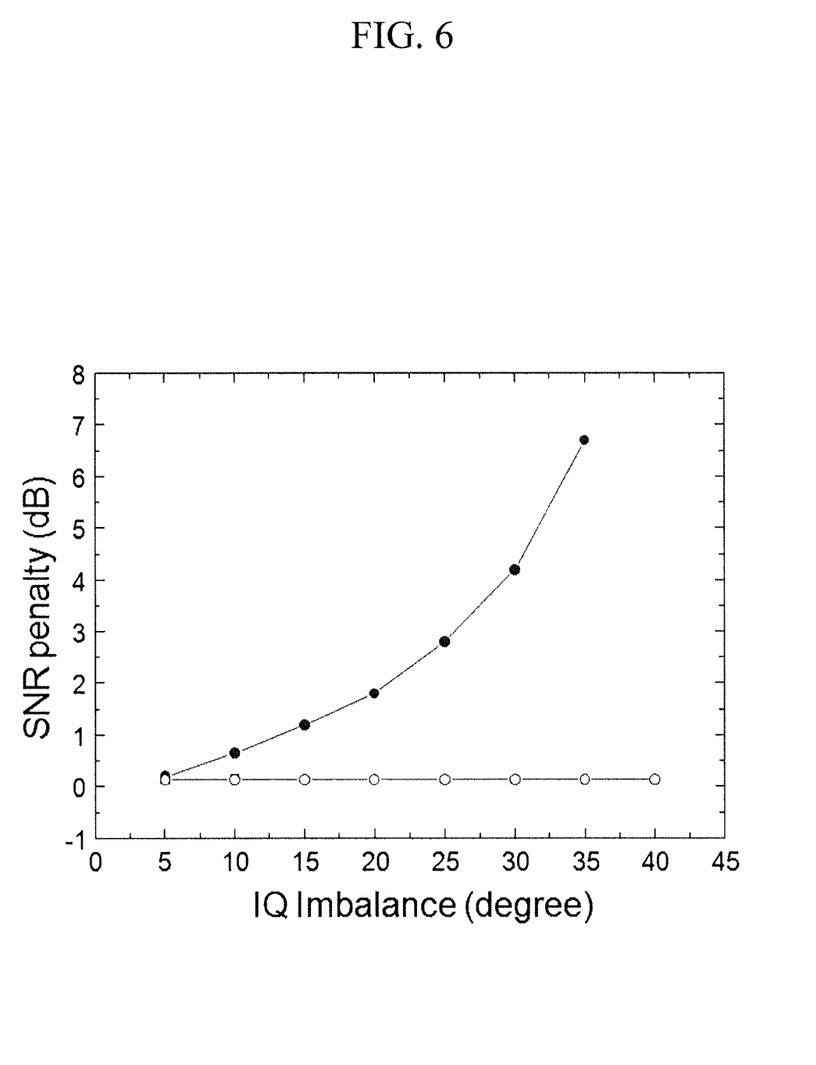
FIG. 6 is a graph illustrating improved performance in an OFDM system when I/Q imbalance is compensated for in a time domain according to an exemplary embodiment of the present invention.

FIG. 6 is a graph illustrating improved performance in an OFDM system when I/Q imbalance is compensated for in a time domain according to an exemplary embodiment of the present invention.

Referring to FIG. 6, a phase error of 30 degrees between the I channel and the Q channel may result in an SNR penalty of 4 dB or greater. This means that an SNR of additional 4 dB is needed when the I/Q imbalance is 30 degrees. However, if the I/Q imbalance is compensated for in a time domain, it should be noted that the SNR penalty is kept as low as 0.2 dB or lower.

Figure 7:
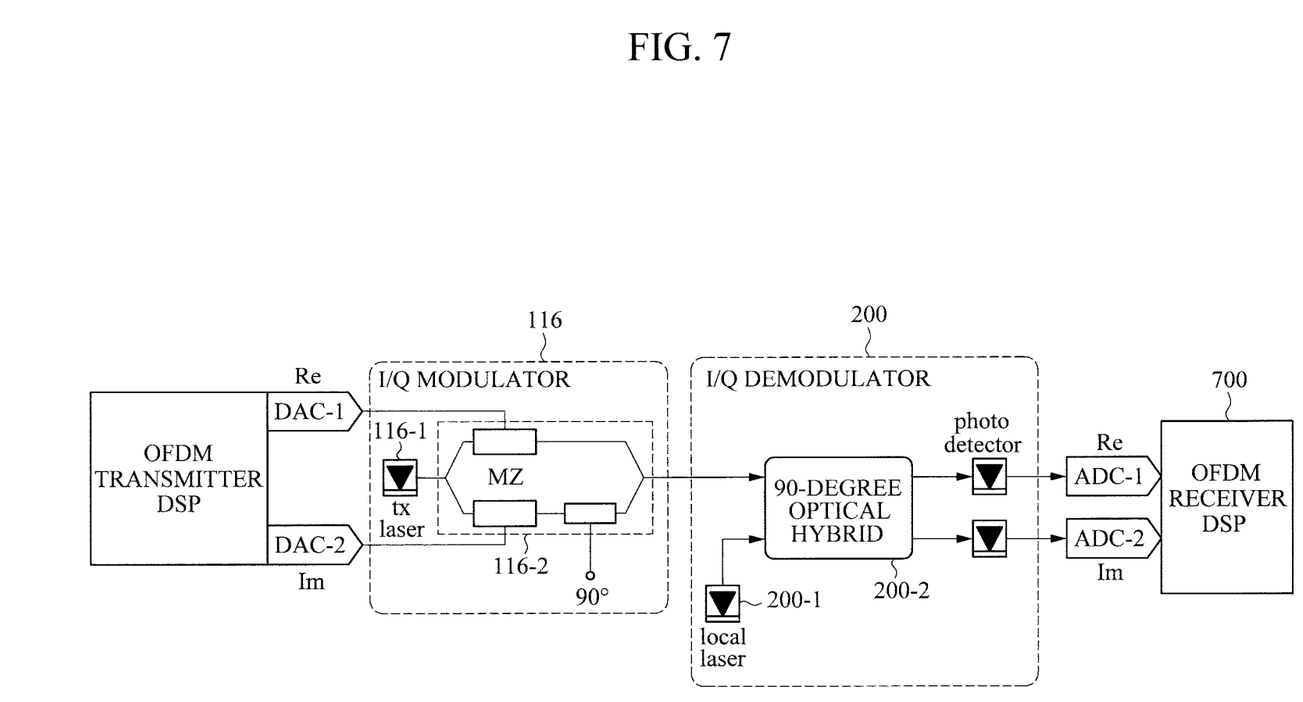
FIG. 7 is a block diagram illustrating an example of an optical OFDM system according to an exemplary embodiment of the present invention.

FIG. 7 is a block diagram illustrating an example of an optical OFDM system according to an exemplary embodiment of the present invention.

The optical OFDM system includes an OFDM transmitter digital signal processor (DSP), an I/Q modulator 116 having a tx laser diode 116-1 and a Mach-Zehnder modulator 116-2, an I/Q demodulator 200 having a local laser diode 200-1 and a 90-degree optical hybrid 200-2, and an OFDM receiver DSP 700.

The I/Q imbalance compensator 210 is implemented in the OFDM receiver DSP 700. The laser diodes 116-1 and 200-1 act as the oscillators in the transmitter and the receiver. The Mach-Zehnder modulator 116-2 and the 90-degree optical hybrid 200-2 act as a high-frequency modulator and a low-frequency demodulator, respectively. The I/Q imbalance compensator 210 may be applied not only to the optical communication system shown in FIG. 7 but to any other communication system employing the OFDM scheme.

Figure 8:
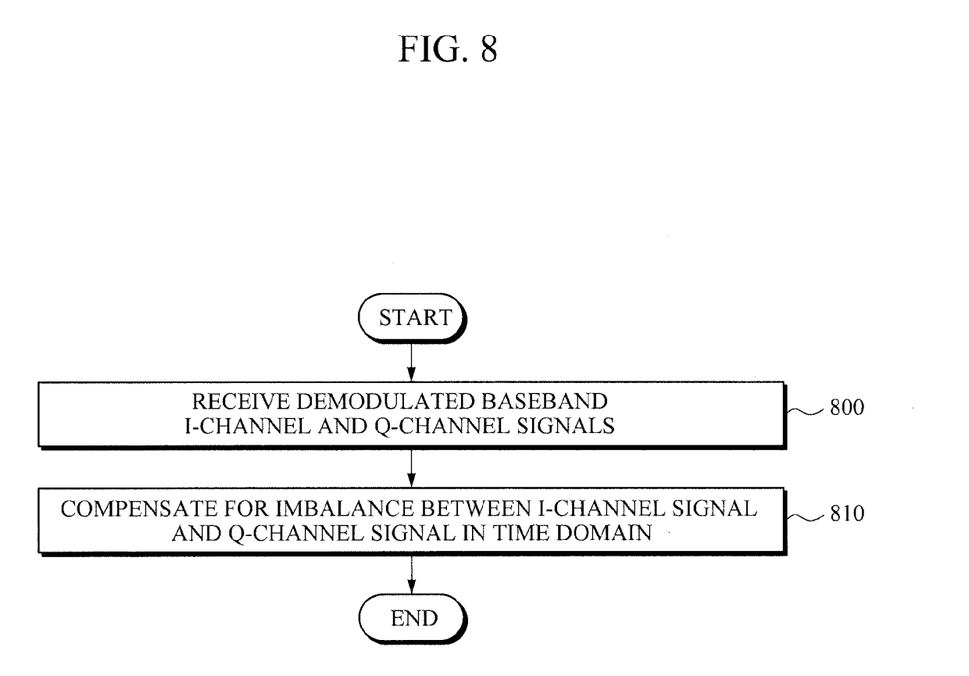
FIG. 8 is a flowchart illustrating an example method of compensating for I/Q imbalance in an OFDM receiver according to an exemplary embodiment of the present invention.

FIG. 8 is a flowchart illustrating an example method of compensating for I/Q imbalance in an OFDM receiver according to an exemplary embodiment of the present invention.

In operation 800, the OFDM receiver DSP 700 receives the I-channel and Q-channel signals which are demodulated by the I/Q demodulator 200 and are converted into digital signals by the ADC-1 202 and the ADC-2 204. The DSP 700 performs time synchronization, frequency offset compensation, FFT, etc. on the digital signals.

In operation 810, the DSP 700 compensates for I/Q imbalance between the I-channel signal and the Q-channel signal in a time domain. In other words, the DSP 700 performs the I/Q imbalance compensation process before performing the FFT process. The DSP 700 may perform the I/Q imbalance compensation before and/or after the frequency offset compensation is performed. If there is no frequency offset compensation process, the DSP 700 performs the I/Q imbalance process once at any stage before the FFT process is performed.

The DSP 700 compensates for the I/Q imbalance using the orthogonality algorithm in operation 810. The orthogonality algorithm is used to make two non-orthogonal vectors orthogonal to each other and normalized in amplitude. Accordingly, the DSP 700 may use the orthogonality algorithm to compensate for errors in the amplitude and phase difference between the I channel and the Q channel which are due to incomplete I/Q modulation/demodulation. Assuming that the two non-orthogonal I and Q channels are $r_I(t)$ and $r_Q(t)$, respectively, the DSP 210 may generate two orthogonal I and Q channels $r_I°(t)$ and $r_Q°(t)$ from the Equations 5, 6 and 7, thereby compensating for the I/Q imbalance.

As apparent from the above description, it is possible to suppress degradation in the performance of the OFDM communication device by compensating for the I/Q imbalance in a time domain. Further, it is possible to maintain stable communication performance at a low signal-to-noise ratio (SNR) and to transmit a large amount of data on a narrow band.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An orthogonal frequency division multiplexing (OFDM) receiver for compensating for I/Q imbalance, comprising:
   an I/Q demodulator demodulating a received signal into a baseband in-phase (I) channel signal and a baseband quadrature (Q) channel signal;
   an I/Q imbalance compensator compensating for imbalance between the I-channel signal and the Q-channel signal in a time domain; and
   a frequency offset compensator compensating for a frequency offset,
   wherein the I/Q imbalance compensator is located upstream of the frequency offset compensator to compensate imbalance between the I-channel signal and the Q-channel signal caused by demodulation in the I/Q demodulator, and
   wherein the I/Q imbalance compensator is located downstream of the frequency offset compensator to compensate imbalance between an I-channel signal and a Q-channel signal caused by I/Q modulation in a transmitter,
   wherein the I/Q imbalance compensator makes the I-channel signal $r_I(t)$ and the Q-channel signal $r_Q(t)$ orthogonal to each other, orthogonal I and Q channel signals $r_I°(t)$ and $r_Q°(t)$ being generated from the following equations:

$r_I°(t)=r_I(t)/\text{sqrt}(P_I)$ $r_Q'(t)=r_Q(t)-\rho r_I(t)/P_I, \rho=E\{r_I(t),r_Q(t)\}$ $r_Q°(t)=r_Q'(t)/\text{sqrt}(P_Q)$ where $P_I$ and $P_Q$ are average power of $r_I(t)$ and average power of $r_Q'(t)$, respectively.

2. An OFDM receiver for compensating for I/Q imbalance, comprising:
   a time-domain signal processor demodulating a received signal into a baseband I-channel signal and a baseband Q-channel signal and compensating for imbalance between the I-channel signal and the Q-channel signal in a time domain; and
   a frequency-domain signal processor converting a time-domain signal output from the time-domain signal processor into a frequency-domain signal and processing the frequency-domain signal,
   wherein the time-domain signal processor compensates for the I/Q imbalance between the I-channel signal and the Q-channel signal caused by demodulation in the I/Q demodulator before compensating for a frequency offset, and
   wherein the time-domain signal processor recompensates for the I/Q imbalance between the I-channel signal and the Q-channel signal caused by I/Q modulation in a transmitter after compensating for a frequency offset,
   wherein the time-domain signal processor makes the I-channel signal and the Q-channel signal orthogonal to each other to compensate for the I/Q imbalance between the I-channel signal and the Q-channel signal in a time domain, orthogonal I and Q channel signals $r_I°(t)$ and $r_Q°(t)$ being generated from the following equations:

$r_I°(t)=r_I(t)/\text{sqrt}(P_I)$ $r_Q'(t)=r_Q(t)-\rho r_I(t)/P_I, \rho=E\{r_I(t),r_Q(t)\}$ $r_Q°(t)=r_Q'(t)/\text{sqrt}(P_Q)$ where $P_I$ and $P_Q$ are average power of $r_I(t)$ and average power of $r_Q'(t)$, respectively.

3. A method of compensating for I/Q imbalance between an I-channel signal and a Q-channel signal in an OFDM receiver, comprising:
   receiving demodulated baseband I-channel and Q-channel signals;
   compensating a frequency offset for the I-channel signal and the Q-channel signal; and
   compensating for I/Q imbalance between the I-channel signal and the Q-channel signal in a time domain,
   wherein compensating for the I/Q imbalance comprises compensating the I/Q imbalance between the I-channel signal and the Q-channel signal caused by demodulation in the I/O demodulator before compensating for a frequency offset and recompensating the I/Q imbalance between the I-channel signal and the Q-channel signal caused by I/Q modulation in a transmitter after compensating for a frequency offset,
   wherein compensating for the I/Q imbalance comprises making the I-channel signal and the Q-channel signal orthogonal to each other, orthogonal I and Q channel signals $r_I°(t)$ and $r_Q°(t)$ being generated from the following equations:

$r_I°(t)=r_I(t)/\text{sqrt}(P_I)$ $r_Q'(t)=r_Q(t)-\rho r_I(t)/P_I, \rho=E\{r_I(t),r_Q(t)\}$ $r_Q°(t)=r_Q'(t)/\text{sqrt}(P_Q)$ where $P_I$ and $P_Q$ are average power of $r_I(t)$ and average power of $r_Q'(t)$, respectively.

* * * * *